Patented Jan. 18, 1938

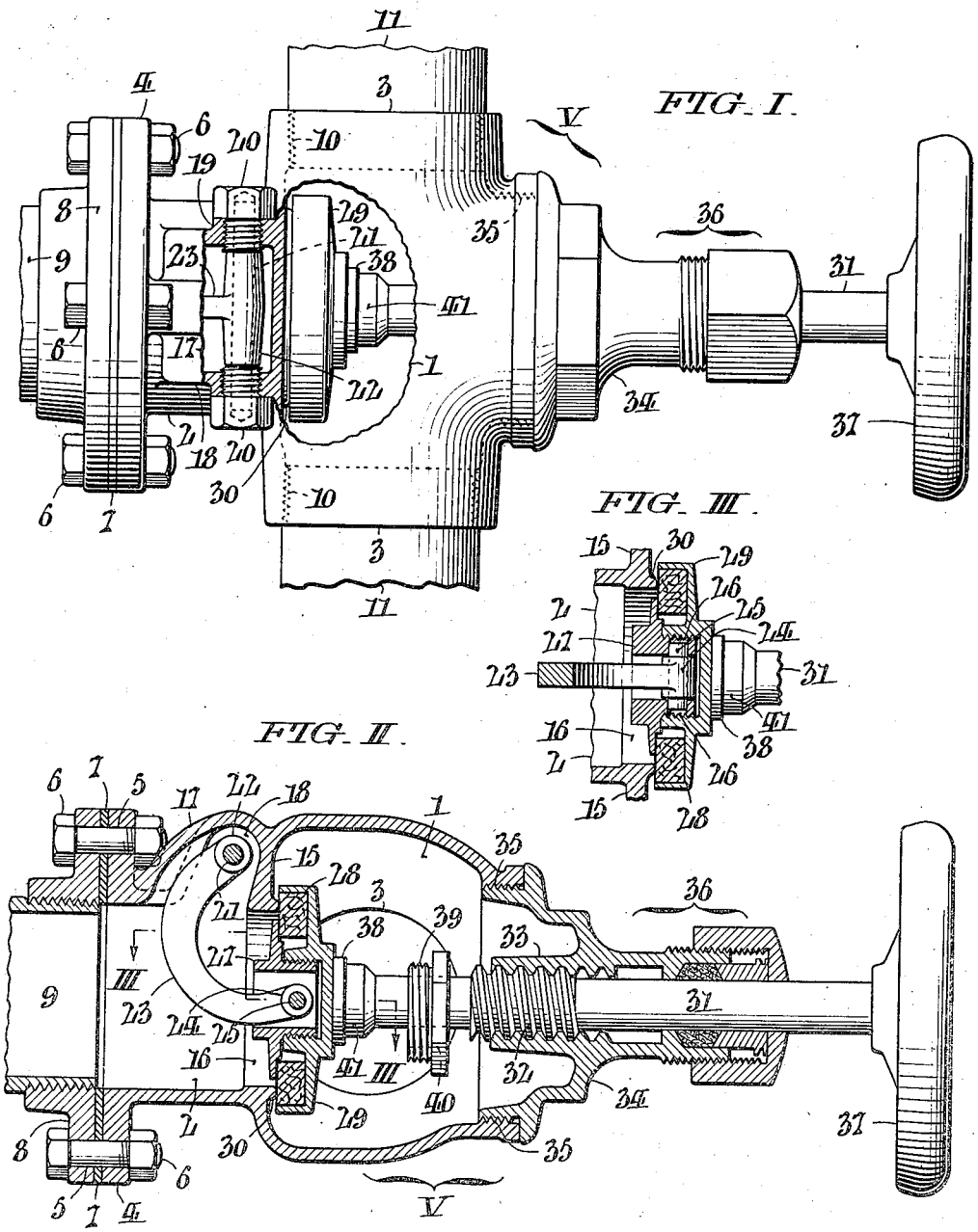

2,106,136

UNITED STATES PATENT OFFICE 2,106,136

VALVE

James A. Jensen, Philadelphia, Pa., assignor to Quaker City Iron Works, Philadelphia, Pa., a corporation of Pennsylvania Application August 21, 1935, Serial No. 37,134

1 Claim. (Cl. 251—125)

This invention relates to check valves as well as to combined check and stop valves; and it is concerned more particularly with combined check and stop valves for multi-compartment tanks of vehicles ordinarily used in the transportation of liquid products like fuel oils, lubricating oils, gasoline, etc. The function of valves of the type specifically referred to is to control flow of the liquids in individual drain pipes leading respectively from the different compartments of the vehicle tanks to a common delivery manifold or pipe, while preventing cross-flow between the compartments and in turn precluding cheating in the delivery and sale of the liquids.
In connection with check valves, and with combined check and stop valves generally, I aim to support the closure members with capacity to automatically move away from the flow apertures of the valves and with capacity moreover to seek an open position in which they will offer the least resistance to fluid flow, so that drainage through them may be effected in a minimum of time and without excessive agitation of the liquids. This objective I realize in practice, as hereinafter more fully set forth, by pivotally connecting the closure member to swinging suspension supports freely fulcrumed within the valve casing.

Another aim of my invention is to reduce as far as possible the bulk of the closure members and thereby further minimize the resistance to the flow of fluids through the valves, which desideratum I attain, as also more fully disclosed hereinafter, by locating the fulcrums of the suspension supports at the inlet sides of the flow apertures and extending said supports through said apertures for pivotal connection of said closure members.

My invention is also directed toward securing the above advantages in check valves or combined check and stop valves which lend themselves readily to serial grouping in the formation of discharge manifolds common to the drain pipes of multi-compartment tanks of vehicles such as hereinbefore mentioned.

Another object of my invention is to provide combined check and flow valves which can be readily converted for service as stop valves only.

Other objects and attendant advantages will be manifest from the detailed description of the accompanying drawing, wherein Fig. I is a view partly in elevation and partly in section of a combined check and stop valve conveniently embodying my invention in one form.
Fig. II is a longitudinal axial section of the valve taken on a plane at right angles to the showing of Fig. I.

Fig. III is a detail sectional view, taken as indicated by the arrows III—III in Fig. II, showing the pivotal connection between the closure member of the valve and its swingable suspension support.

Referring more in detail to Figs. I–III inclusive, the check and stop valve therein shown and comprehensively designated as "V", comprises a T-shaped body 1 with a lateral inlet 2, and axially aligned outlet branches 3 in the same plane with said inlet. The described construction of the body 1 is advantageous in that it permits a number of the valves to be serially grouped for the purpose of providing a common manifold. The inlet 2 has a flange 4 with circumferentially spaced holes 5 whereby the valve V is connectable by suitable fastening means 6 and with interposition of a sealing gasket 7 to the terminal flange 8 of a flow conduit 9, which, for example, may be one of the discharge pipes of compartmental vehicle tanks, for example.

The outlet branches 3 are internally screwthreaded at 10, for attachment of coupling nipples 11 whereby a series of the valves "V", may be alignedly connected together, to provide a common manifold in an obvious mannner.

As further illustrated, the valve body 1 has an internal partition 15 which separates the inlet 2 from outlets 3, said partition having a flow orifice 16 therethrough in concentric relation to the bore of the inlet 2. At the inlet side of the partition 15, the valve casing 1 has a hollow hook-like offset or protrusion 17 whereof the side walls 18 are formed with opposing apertured embossments 19, which are screw-threaded for reception of axially socketed studs 20, see Fig. I. As shown, these studs 20 serve as bearings for a hinge or fulcrum pin 21 engaging the boss 22 of a freely-suspended or pendulous support in the form of an arm 23. The arm 23 it will be noted, is curved to reach through the flow orifice 16, and moreover, provided at its swinging end with another apertured boss 24. A pivot pin 25 extends through the boss 24 of the arm 23 and engages diametrically aligned holes 26, Fig. III, in a flanged sleeve-like clamp nut 27, which, in the present instance serves to secure a gasket 28 in the recessed face of a disk-like closure member 29 which is adapted to close against a seat 30 around the orifice 16 at the outlet side of the partition 15. By virtue of the above construction, the closure disk 29 is free to swing bodily away from the flow orifice 16 about the fulcrum

21 as a center, as well as to swing independently on its pivot 25 in seeking an open inclined position in which it offers a minimum resistance to fluid flow. By disposing the fulcrum of the arm 23 for the closure disk 29 as described, it will be apparent that the bulk of the latter is reduced to a point where it offers a minimum resistance to fluid flow.

In practice, by constructing the swingable support 23 and the metallic parts of the closure member 29 of a light metal like aluminum, I further reduce the resistivity of the valve to fluid flow and render the opening of the closure member 29 correspondingly easier.

As a means for operating the valve V, I employ an actuating stem 31 with threads 32 engaged in a boss 33 of a bonnet 34 screwed into an opening 35 of the valve body 1 in axial alignment with the inlet 2. After common practice in the art, the bonnet 34 is provided with a suitable packing gland 36, to prevent leakage past the stem 31, to the outer end of which a manipulating hand wheel 37 is secured.

In order that the valve may be converted for service as a stop valve only, there is mounted on the stem 31, intermediate the threaded portion 32 and a flange head 38 at its inner end, a sleeve nut 39 having its bore 40 corresponding substantially in diameter to that of the stem enlargement 41 adjoining said head 38, for a purpose hereafter explained. If it is desired to change the functioning of the valve "V" as just noted, into a stop valve, all that is necessary is to remove the bonnet 34 and stop stem 31 as a unit, then remove one of the studs 20, withdraw the pivot pin 21 and remove the crank arm 23 with the connected closure disk 29 and associated parts, and replace the stud 20 to seal up its opening, and then apply a substitute closure member in an obvious manner.

Having thus described my invention, I claim:

In a combined check and stop valve of the type described the combination of a body having aligned fluid outlets and a lateral fluid inlet in a common plane, a partition extending crosswise of the inlet, a closure member to cooperate with the flow orifice in the partition at the outlet side of the latter, a curved arm fulcrumed to the valve body by axially aligned socketed studs and a mutually engaging hinge pin, said arm being freely suspended on the inlet side of the partition and projecting at its other end through the flow orifice to the outlet side thereof, a pivot pin engaged in diametrically opposed holes of a sleeve-like clamp nut whereby the closure member is pivotally connected to the curved arm and can automatically swing away from the flow orifice and independently seek an open relatively-inclined position, and an actuating screw stem axially aligned with the inlet of the valve whereby the closure member may be moved against pressure to close the flow orifice.

JAMES A. JENSEN.